United States Patent
Cercone et al.

[11] 3,904,436
[45] Sept. 9, 1975

[54] METHOD AND MEANS FOR ACTIVATING A CLOSED BATTERY

[75] Inventors: Ronald Cercone, Pawcatuck; Edward S. Dennison, Waterford, Conn.

[73] Assignee: Electrochem, Inc., New York, N.Y.

[22] Filed: Oct. 11, 1973

[21] Appl. No.: 405,663

[52] U.S. Cl. .................................. 136/90; 136/114
[51] Int. Cl.² ......................................... H01M 6/32
[58] Field of Search .............................. 136/90, 114

[56] References Cited
UNITED STATES PATENTS

| | | | |
|---|---|---|---|
| 1,401,671 | 12/1921 | Chubb | 136/114 UX |
| 1,484,779 | 2/1924 | Heise | 136/114 |
| 2,826,627 | 3/1958 | Aldrich | 136/90 |
| 2,938,065 | 5/1960 | Bauer | 136/90 |
| 3,483,042 | 12/1969 | Hulse | 136/114 X |
| 3,671,318 | 6/1972 | Moe | 136/90 UX |

*Primary Examiner*—Verlin R. Pendegrass
*Attorney, Agent, or Firm*—Donald F. Nist

[57] ABSTRACT

A method of activating a closed battery containing solid hygroscopic electrolyte is provided which comprises reducing the pressure within the battery to below atmospheric, releasing water vapor within the battery while pressure in the battery is in a reduced state and maintaining the water vapor in the battery until a battery-activating portion of the electrolyte is dissolved and activated. The reduction of pressure in the battery to below atmospheric removes fluid from voids in the electrolyte, thus assuring uniform activation of the electrolyte and optimum performance of the battery. The method has particular application to batteries containing a large number of cells. After the pressure reduction, water can be introduced in the closed battery and water vapor can be generated in situ, with or without the aid of heat. Fluid circulation and cooling means may be provided to stabilize the battery temperature, particularly since dissolving of the electrolyte generates heat.

The invention includes an improved battery containing battery-activating means in the form of a water reservoir, means for adding water to the reservoir and, in a preferred embodiment, means for heating the water while in the battery to help vaporize the same.

13 Claims, 1 Drawing Figure

PATENTED SEP 9 1975　　　　　　　　　　　　　　　　3,904,436
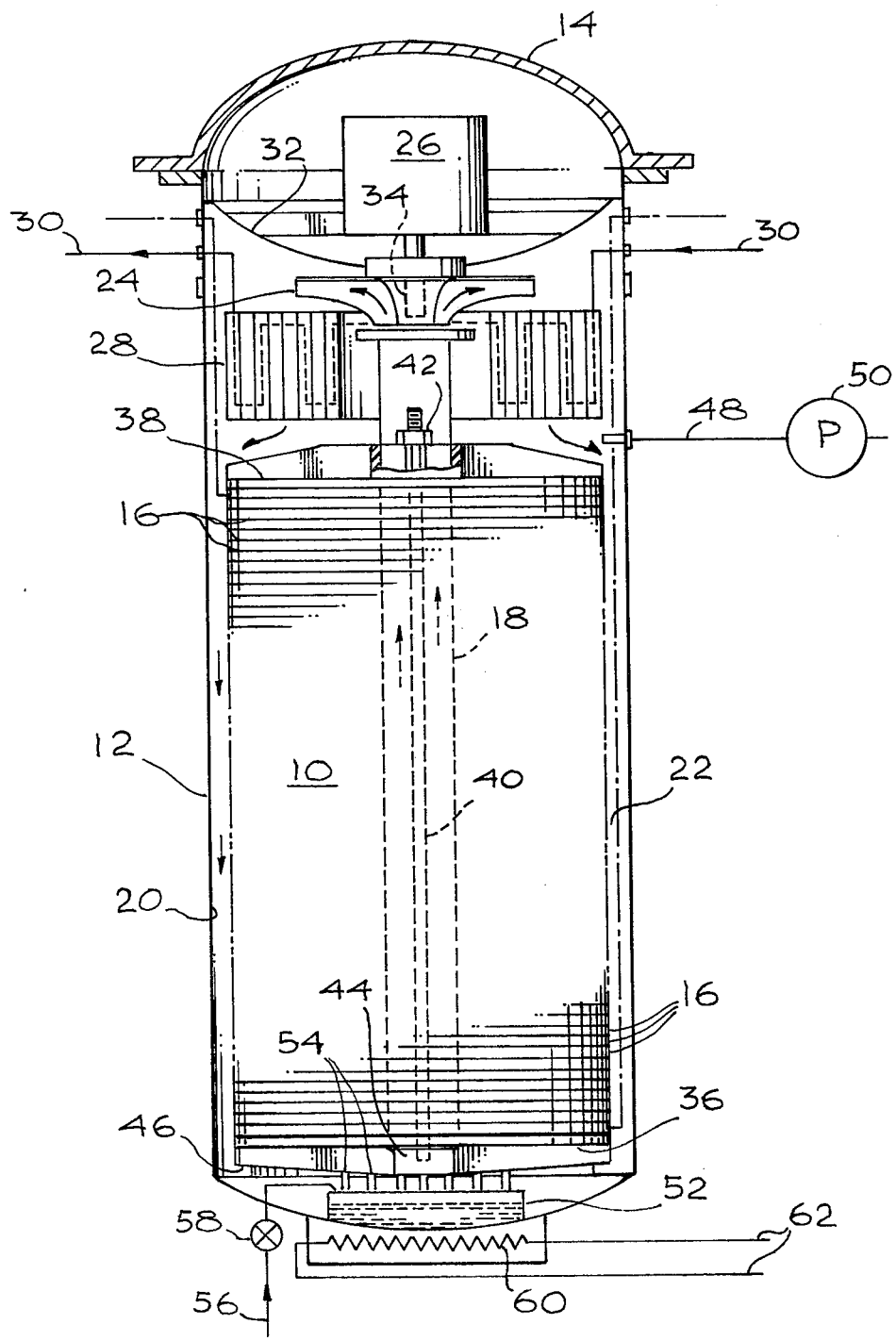

METHOD AND MEANS FOR ACTIVATING A CLOSED BATTERY

BACKGROUND OF THE INVENTION

1. Field of the Invention

The present invention generally relates to batteries, and more particularly relates to a method of activating a closed battery and a battery providing improved activating means.

2. Prior Art

Difficulties have been encountered in the uniform activation of large batteries containing a plurality of cells, each of which includes hygroscopic electrolyte. Normally, such batteries are activated by opening them and adding an activating fluid such as water. As water is introduced into the open battery to activate the battery cells, usually a large amount of heat is produced so that the battery cell activation procedure becomes nonuniform. Moreover, the activation procedure may take an appreciable amount of time to be completed. Normally, there are substantial voids in the electrolyte to be activated, so that the water added thereto has difficulty in penetrating to all parts of the electrolyte. In this regard, oxygen and other gases may be present in the voids in the electrolyte. Such gases not only obstruct the activation procedure, but also can adversely affect the performance of the battery.

If, water vapor is passed into the battery to activate it, the vapor also will not penetrate uniformly to all parts of the electrolyte if oxygen and/or inert gases are present in the voids in the electrolyte. Moreover, water vapor tends to stratify in the battery whereby activation of the electrolyte is impeded.

In certain circumstances, due to the inaccessibility of the battery, it may be difficult or impossible to activate the battery when it is in place. Yet preinstallation of the unactivated battery might be highly desirable for other reasons. Accordingly, there has been a substantial need for an improved method of activating a multi-cell battery. Such method should be reliable and convenient and should result in good uniformity of activation throughout the cells in a relatively short period of time. The method should be applicable to closed batteries. There has also been a need for means of improving penetration of activating fluids to the battery cells and of assuring uniform performance of the cells when activated.

SUMMARY OF THE INVENTION

The present invention satisfies the foregoing needs. In this regard, an improved method of activating closed multi-cell batteries containing a solid electrolyte activatable by water or water vapor is provided. An improved multi-cell battery of the closed type is also provided which contains improved means for activating the same. The improved battery and the improved activation method of the invention are substantially as set forth in the Abstract above.

The method is characterized in part by initially evacuating the battery to a low subatmospheric pressure. This has the effect of removing fluids such as inert gases, oxygen and the like, from the electrolyte of the cells in the battery. Moreover, the low pressure assures that water, when added to the battery, easily vaporizes and that when water vapor is added to the battery it uniformly spreads and penetrates to and through the electrolyte in each of the cells without stratification, significant dilution, etc. Such procedure is rapid, simple, and fully effective and permits full operation of the battery for improved performance. Further details of the invention are set forth in the following Detailed Description and the accompanying Drawings.

DRAWINGS

The single FIGURE of the drawings schematically depicts, with portions in cross-section, a preferred embodiment of the battery of the invention.

DETAILED DESCRIPTION

As shown schematically in the single FIGURE of the accompanying drawings, a closed battery 10 in accordance with the present invention may include a generally cylindrical hollow housing or canister 12 with a sealed removable cover 14. The canister 12 contains therewithin a plurality of stacked cells 16, each cell 16 including a pair of electrodes (not shown) and an electrolyte (not shown) activatable by water or water vapor. The cells 16 are stacked on a generally vertically extending central core 18. In the stacked position, the cells 16 are disposed inwardly from the sidewall 20 of the canister 12 so that a peripheral fluid circulation space 22 is provided there between.

The central core also includes circulation spaces (not shown) and in the area above the stack of cells 16 in the battery 10 there are provided means for circulating and cooling fluids. Such means include a circulating blower 24 operated by a motor 26 activated by electricity or the like. Adjacent to the blower 24 is a cooling core 28 to which are attached through wall 20 lines 30 extending into and out of the battery 10. The motor 26 is preferably sealed from the remainder of the battery, as by a wall 32 through which the motor rotor 34 extends for operation of the blower.

The cell stack is releasably held in position on the central core 18 by a bottom plate 36, a top plate 38 and a threaded bolt 40 extending through the core 18 and top plate and releasably secured to bottom plate 36. Top plate 38 is releasably held down on the top of the cell stack as by a nut 42 screwed down on the bolt 40 and impinging on the top plate 38. Bottom plate 36 has a foot 44 depending therefrom and supporting the cell stack above the upper surface of the base 46 of canister 12, as shown in the single FIGURE.

A vacuum line 48 with vacuum pump 50 is connected to the interior of the battery 10 for reducing the pressure therein. In addition, means are provided for the introduction of water vapor into the battery when it is evacuated. Although such means may comprise a water vapor inlet line (not shown), in the embodiment illustrated in the single FIGURE such means comprise an evaporator pan 52 disposed in the base 46 of the battery and communicating through holes 54 in base 52 with peripheral space 22. A water inlet line 56 is connected to the pan 52 and a valve 58 is disposed in the line 56. Means external of the battery but adjacent to the pan 52 are provided for heating water when in the pan 52 to facilitate evaporation thereof. Such means comprise a heating element 60, powered by electricity from electrical leads 62.

The electrolyte (not shown) for the cells 16 is strongly hygroscopic and may comprise, for example, potassium hydroxide mixed with zinc particles (anode material) or the like, and compressed to form fuel slugs for the cells. The cell cathodes may be of nickel, zinc, copper or the like. Details of the cell construction may vary. One suitable type of cell construction for a metal-air battery is set forth in co-pending U.S. patent application Ser. No. 396,010, filed Sept. 10, 1973, entitled *Improved Multi-Cell Metal-Fluid Battery*, of which Edward Dennison is the inventor, said co-pending application having been assigned to the assignee of the present application.

The canister 12 may be of any suitable material, such as metal or the like, as can the circulating blower, cooling core and central stacking core, evaporator pan, etc.. The materials utilized in the battery should be resistant to the corresive effects of water vapor and solid and dissolved electrolyte. For example, the canister 12 can be of stainless steel or the like. So also can the blower.

A typical way of activating the battery 10 of the invention in accordance with the novel method of the invention comprises evacuating the canister 12 to below about 1 millimeter Hg or less pressure, as through vacuum line 48 and pump 50, and then feeding water, for example, at room temperature, through the water inlet line 56 with valve 58 open to the evaporator pan 52. Simultaneously, mild heat can be applied to the evaporator pan 52 by means of heating element 60 at a rate sufficient to evaporate the quantity of water needed to fully activate the electrolyte in the cells 16 of the battery 10 within reasonable time, for example, 2 hours or less.

The circulating blower 24 preferably is activated as by motor 26 and rotor 34, so that the water vapor so generated in situ in the battery 10 is uniformly circulated via the peripheral space 22 and central spaces to and through all the cells 16 of the stack. The cooling core 28 can also be used to limit the maximum temperature built up within the battery. While the evaporation of water to form the water vapor requires the input of 1050 BTU per lb. of water, condensation of the water vapor at the electrolyte results in the release of this same amount of heat, namely 1050 BTU per lb. of water. Moreover, in the dissolving of the electrolyte, heat is released. For example, when the electrolyte is potassium hydroxide, 415 BTU are released per lb. of electrolyte dissolved. Regulation of cell temperature during the activation procedure is desired to assure an optimum but not excessive ambient temperature.

If the water in pan 52 is not heated, as by element 60, the length of time required for fuel activation of the battery 10 is longer than when the water in pan 52 is heated to, for example, 150°F. The more rapidly the water vapor is generated, the more rapid the procedure. However, when heat is put into the battery via heating of the water, as to more rapidly vaporize the same, it is necessary to extract at least a portion of this heat through the cooling core to heat balance the system. It is also important for maximum efficiency in the activation procedure to force circulate the water vapor by means of the blower 24 so as to assure uniform saturation of the electrolyte and a uniform temperature throughout the cells at all stages of activation.

When all the water necessary to fully activate all cells 16 in the battery 10 has been vaporized, the heating element 60 can be shut off and the battery 10 can then be permitted to fully activate, then cool to room temperature. The battery is then ready for use, after normal pressure is restored in the battery by releasing the vacuum. If desired, the vacuum on battery 10 can be maintained during operation of the battery.

The described battery has been found to operate successfully with full power following the activation method of the invention. Such method is applicable to a considerable number of multi-cell closed batteries, such as metal-air batteries and other types, and is rapid, economical and highly effective for the intended purposes.

Various modifications can be made in the present method, its steps and parameters and in the present battery and its components. All such modifications as are within the scope of the appended claims form part of the present invention.

What is claimed is:

1. A method of activating closed batteries, which method comprises reducing the pressure to below atmospheric in a closed inactive battery containing solid hygroscopic electrolyte, and releasing water vapor in said battery while said pressure is in a reduced state and maintaining said water vapor in said battery until at least a battery activating portion of said electrolyte is dissolved by said vapor.

2. The method of claim 1 wherein said battery is evacuated to reduce said pressure, thereby removing fluid from voids in said electrolyte prior to said release of water vapor.

3. The method of claim 1 wherein water is introduced into said closed battery after said pressure reduction and said water vapor is generated in situ in said battery from said water.

4. The method of claim 3 wherein said battery includes a plurality of cells and wherein said water is mechanically heated while in said battery to facilitate formation of said water vapor.

5. The method of claim 1 wherein said battery includes a plurality of cells, each containing said electrolyte, and wherein said electrolyte comprises solid potassium hydroxide.

6. The method of claim 5 wherein electrode material comprising zinc is present in discrete particulate form admixed with said electrolyte in each of said cells.

7. A method of activating closed batteries, which method comprises reducing by evacuation the pressure to below atmospheric in a closed inactive battery containing solid hygroscopic electrolyte, thereby removing fluid from voids in the electrolyte, then releasing water vapor in said battery while said pressure is in a reduced state, maintaining said water vapor in said battery until at least a battery-activating portion of said electrolyte is dissolved by said vapor, and cooling and circulating said water vapor in said battery by an internal fluid circulation system and cooling means in said battery to stabilize and control the temperature of said battery during said dissolving of said electrolyte.

8. The method of claim 7 wherein said battery includes a water reservoir into which said water is introduced and wherein said water in said battery is heated by heating means external of said battery to facilitate said water vapor generation.

9. An improved closed activatable battery, said battery comprising:
   a. at least one cell including a pair of electrodes and solid hygroscopic electrolyte;
   b. a solid housing enclosing said cell;
   c. a water reservoir within said housing;
   d. means for adding water to said reservoir;

e. means for reducing the atmospheric pressure in said battery;
f. fluid circulating means within said housing; and,
g. fluid cooling means within said housing.

10. The improved battery of claim 9 wherein said battery includes means for heating water mechanically when in said reservoir.

11. The improved battery of claim 9 wherein said battery includes a plurality of cells, each of said cells including said solid electrolyte and a pair of electrodes.

12. The improved battery of claim 9 wherein said electrolyte comprises solid potassium hydroxide.

13. The improved battery of claim 11 wherein electrode material comprising zinc is present in discrete particulate form admixed with said electrolyte in each of said cells.

* * * * *